May 19, 1942. J. B. WESTENHAVER 2,283,479

PARACHUTE

Filed March 1, 1941

INVENTOR
John B. Westenhaver.
BY Martin J. Manion
ATTORNEY

Patented May 19, 1942

2,283,479

UNITED STATES PATENT OFFICE 2,283,479

PARACHUTE

John B. Westenhaver, Wheeling, W. Va.

Application March 1, 1941, Serial No. 381,269

1 Claim. (Cl. 244—145)

This invention relates to parachutes and is designed to provide a novel construction which will open quickly and positively and which has a greater load carrying capacity than parachutes now in use.

With these and other objects in view, the invention is illustrated in the accompanying drawing, in which—

Figure 1:
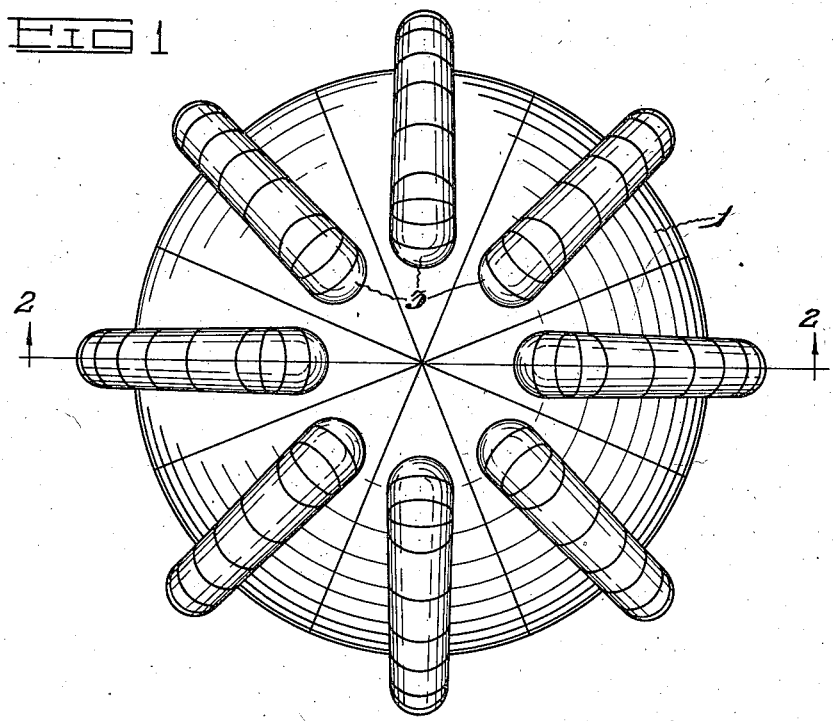
Figure 1 is a top plan view of a parachute embodying my invention.
Figure 2:
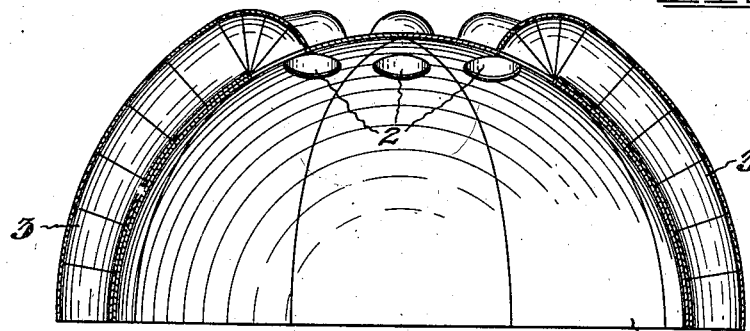
Figure 2 is a vertical sectional view taken on line 2—2, Fig. 1; and—
Figure 3:
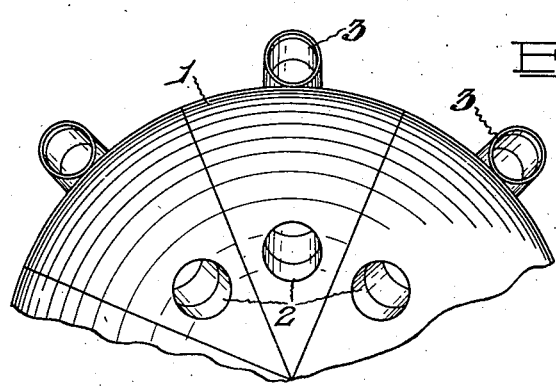
Figure 3 is a fragmentary bottom plan view of the same.

Referring to said drawing, the reference numeral 1 designates the envelope of the parachute consisting of a plurality of segmental, lightweight, fabric sections permanently fastened together to form a substantially semi-spherical body.

Radially disposed about the top of the parachute are a plurality of equally spaced vents or ports 2. Encircling each of said vents 2 and appropriately fastened to the fabric of the parachute is the upper end of an exhaust duct or tube 3. Each of said ducts 3, also preferably fabricated from segmental sections of lightweight fabric, extends downward about the curvature of the outer surface of the parachute and terminates at the lower peripheral or leading edge thereof. As shown in the drawing, each of the ducts 3 is of tapered form, the diameter at the lower end being smaller than the diameter of the upper end. Said tubes are preferably attached throughout their entire length to the outer surface of the parachute by stitching or other appropriate means.

The function of the draft ducts 3 and their associated exhaust vents 2 is to permit free flow of air into and out of the parachute to facilitate initial opening and also to increase the efficiency of retarding the descent of a body through air. Owing to the fact that air may be passed into and out of the parachute by reason of the provision of the vents and ducts, any gap that occurs when a collapsed parachute is released from its enclosing pack will immediately be filled with air. This air immediately commences to flow into the interior of the envelope and outward therefrom through the vents 2 and ducts 3. Owing to the restricted cross-section size of the ducts 3, a pressure is created along and on the inner side of the parachute in the area where the air stream is flowing. This outward pressure bears on the interior of the side wall causing an expansion of the sides and, as a consequence, the parachute is promptly forced open and becomes filled with moving air. A parachute having a closed top and not equipped with the exhaust vents and ducts offers resistance in its upper portion to the entrance of air and opening is comparatively slow and not at all positive.

During descent, the ducts 3 conduct air under pressure from the interior of the parachute to the outer circumferential edge of the body. This air, as it is discharged under pressure from the ducts, encounters the counteratmospheric air pressure at the mouths of the ducts so that there results an opposing air force which creates a decided resistance to the descent of the parachute. The tapered form of the ducts 3 providing a smaller outlet than the inlet not only increases the velocity of the discharged air, but also tends to fill the ducts quickly when initially opening the parachute.

An important factor in providing great descent retardation is due to the fact that the air which is constantly passing through the parachute to the exhaust vents and ducts acts on the internal wall with a continuous streamline flow.

The loss of air released through the exhaust ducts is more than compensated for by the increased retarding force obtained by the streamline flow of air bearing on the inner surface of the envelope and the opposing air forces at the discharge ends of the exhaust ducts.

What is claimed is:

A parachute comprising a substantially semispherical envelope having a peripheral leading edge, a plurality of air exhaust vents radially disposed about the top of the envelope, air exhaust ducts attached to the envelope and having their air entrance ends connected to said envelope about the air vents in the top of the envelope and having the opposite, air discharge ends terminating adjacent the peripheral leading edge of said envelope so that, during descent of the envelope through space, air may be discharged outwardly of the envelope and downwardly through said ducts from whence it is discharged from the lower ends of said ducts adjacent the leading edge of the envelope against the counter atmospheric pressure.

JOHN B. WESTENHAVER.